US005561281A

United States Patent [19]

Eda et al.

[11] Patent Number: 5,561,281

[45] Date of Patent: Oct. 1, 1996

[54] AUTOMATIC TRANSACTION APPARATUS FOR CASH TRANSACTION

[75] Inventors: Masaru Eda, Kamakura; Toshio Oguma, Funabashi, both of Japan

[73] Assignee: Kabushiki Kaisha Toshiba, Kawasaki, Japan

[21] Appl. No.: 334,327

[22] Filed: Nov. 2, 1994

[30] Foreign Application Priority Data

Nov. 2, 1993 [JP] Japan .................................... 5-274556

[51] Int. Cl.$^{6}$ ...................................................... G06F 17/60

[52] U.S. Cl. ................................ 235/379; 902/13; 902/14

[58] Field of Search .............................. 235/379; 902/13, 902/14, 15, 16; 209/534

[56] References Cited

U.S. PATENT DOCUMENTS 4,275,667 6/1981 Hilton ....................................... 109/44

4,337,393 6/1982 Hilton ..................................... 235/487

4,524,268 6/1985 Fukatsu .................................. 235/379

4,816,652 3/1989 Wildgoose .............................. 235/379

4,992,648 2/1991 Hutchison .............................. 235/379

5,105,364 4/1992 Kawamura ............................. 364/478

5,173,590 12/1992 Nakano ................................. 235/379

*Primary Examiner*—Donald T. Hajec

*Assistant Examiner*—Karl D. Frech

*Attorney, Agent, or Firm*—Cushman Darby & Cushman, L.L.P.

[57] ABSTRACT

Each of multiple cash cassettes is provided with a light-emission type push-button switch capable of indicating the operation state of the cash cassette and the need to exchange the cash cassette. By depressing the push-button switch, the associated cash cassette is separated from the cash transaction operation under the control of a CPU. When a customer is in front of a transaction apparatus or while a cash transaction is being carried out, a lamp of the push-button switch associated with the cash cassette, from which banknotes may be taken out in a subsequent dispensing operation, is flickered at a cycle of 1 second. When banknotes are replenished in the cash cassette, the banknotes can be replenished without suspending the operation of the apparatus, and the operation efficiency and operability of the apparatus can be enhanced.

13 Claims, 8 Drawing Sheets

| | KIND | NUMBER OF STORED NOTES | STATE OF SEPARATION | END. FLAG |
|---|---|---|---|---|
| CASH CASSETTE 36 | 10.000 YEN | 1500 | READY | |
| CASH CASSETTE 37 | 10.000 YEN | 2000 | SEPARATED | |
| CASH CASSETTE 38 | 1.000YEN | 2000 | READY | |

| STATE | LAMP DISPLAY |
|---|---|
| CASSETTE BEING SEPARATED | OFF |
| CASSETTE IN OPERATION | ON |
| CASSETTE READY | 1-SEC. CYCLE FLICKER |
| REQUEST FOR SEPARATION BEING ACCEPTED | 0.5-SEC. CYCLE FLICKER |

FIG. 6

| | KIND | NUMBER OF STORED NOTES | STATE OF SEPARATION | END. FLAG |
|---|---|---|---|---|
| CASH CASSETTE 36 | 10.000 YEN | 1500 | READY | |
| CASH CASSETTE 37 | 10.000 YEN | 2000 | SEPARATED | |
| CASH CASSETTE 38 | 1.000YEN | 2000 | READY | |

FIG. 7

AUTOMATIC TRANSACTION APPARATUS FOR CASH TRANSACTION

BACKGROUND OF THE INVENTION

1. Field of the Invention

The present invention relates to an automatic transaction apparatus for automatically depositing/withdrawing banknotes and/or coins at financial facilities such as a bank by a customer's operations.

2. Description of the Related Art

Recently, the following types of automatic transaction apparatuses have been developed as automatic teller machines and have been introduced in financial facilities such as banks to provide quick services to customers (or users): (1) a cash dispenser for automatically dispensing cash equivalent to the amount of withdrawal requested by a customer, wherein a customer's card is inserted in the cash dispenser and on-line communication is carried out with a host computer (central facilities); (2) a cash dispenser for automatically dispensing an amount of cash equivalent to the amount of withdrawal requested by a customer, wherein a customer's bankbook is inserted in the cash dispenser and on-line communication is carried out with a host computer; and (3) an automatic depositing/withdrawing apparatus for automatically receiving and dispensing cash by using a bankbook.

In a typical transaction apparatus, as disclosed in U.S. Pat. No. 4,524,268, a plurality of detachable cash cassettes are provided and banknotes of a predetermined amount are pulled out from the cash cassettes in accordance with a customer's operation, those banknotes being dispensed to the customer. Received banknotes are stored in the cash cassettes.

The number of banknotes in the cash cassettes decreases as the number of transactions increases. If the number of banknotes decreases below a predetermined value, it is necessary to replenish banknotes in the cash cassettes. In this case, the cash cassettes need to be detached from a safe unit and the operation of the automatic transaction apparatus must be suspended each time the cash cassettes are detached. Consequently, the operation efficiency of the apparatus is degraded and the operability is deteriorated.

SUMMARY OF THE INVENTION

The object of the present invention is to provide an automatic transaction apparatus capable of replenishing cash in cash cassettes without suspending the operation of the apparatus, thus enhancing operation efficiency and operability.

According to a first aspect of the present invention, there is provided an automatic transaction apparatus for performing a cash withdrawal transaction by a customer's operation, the apparatus comprising:

a plurality of cash cassettes storing cash for dispensation, the cash cassettes being detachably attached to the automatic transaction apparatus;

dispensing means for dispensing cash stored in the cash cassettes for the withdrawal transaction;

determination means for determining whether detachment of any of the cash cassettes is allowable because the associated cassette is not being used for the withdrawal transaction, on the basis of the operation state of the automatic transaction apparatus;

display means, provided in association of each of the cassettes, for indicating whether detachment of the associated cassette is allowable because the associated cassette is not being used for the withdrawal transaction, on the basis of a determination result obtained by the determination means;

designation means for designating detachment of the cash cassette, the detachment of which is displayed to be unallowable by the display means;

sensing means for sensing, on the basis of the determination result of the determination means, a state in which detachment of the cassette, which was displayed to be unallowable and designated by the designation means, has come allowable; and display changing means for changing, when the sensing means has sensed the state in which detachment of the cassette has become allowable, the display content of the associated display means to indicate the allowable state.

According to a second aspect of the invention, there is provided an automatic transaction apparatus for automatically performing a cash transaction, the apparatus comprising:

a plurality of cash storage means, detachably attached to the apparatus, for storing cash;

cash dispensing means for taking out cash from the cash storage means and dispensing the cash;

first display means for indicating that detachment of the cash storage means is allowable;

second display means for indicating the state in which the cash storage means is operating, when the cash is being taken out of the cash storage means by the cash dispensing means; and third display means for displaying a ready state of the cash storage means from which cash is possibly taken out by the dispensing means in the cash transaction.

According to a third aspect of the invention, there is provided an automatic transaction apparatus for automatically performing a cash transaction, the apparatus comprising:

a plurality of detachable cash storage means for storing cash, at least two of the cash storage means storing the same kind of currency;

a plurality of remaining-cash sensing means for sensing the amount of remaining cash in the cash storage means and providing sensed results;

first taking out means for taking out cash preferentially from one of the at least two of the cash storage means storing the same kind of currency, which contains less cash, on the basis of the sensed results of the remaining-cash sensing means; and display means for indicating detachment of one of the at least two of the cash storage means storing the same kind of currency, which contains more cash, is allowable, on the basis of the sensed results of the remaining-cash sensing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 shows the light emission states of lamps of push buttons associated with the operation states of the cash cassettes;

FIG. 7 shows an example of information relating to the states of the cash cassettes;

DETAILED DESCRIPTION OF THE PREFERRED EMBODIMENTS

An embodiment of the present invention will now be described with reference to the accompanying drawings.

Figure 1:
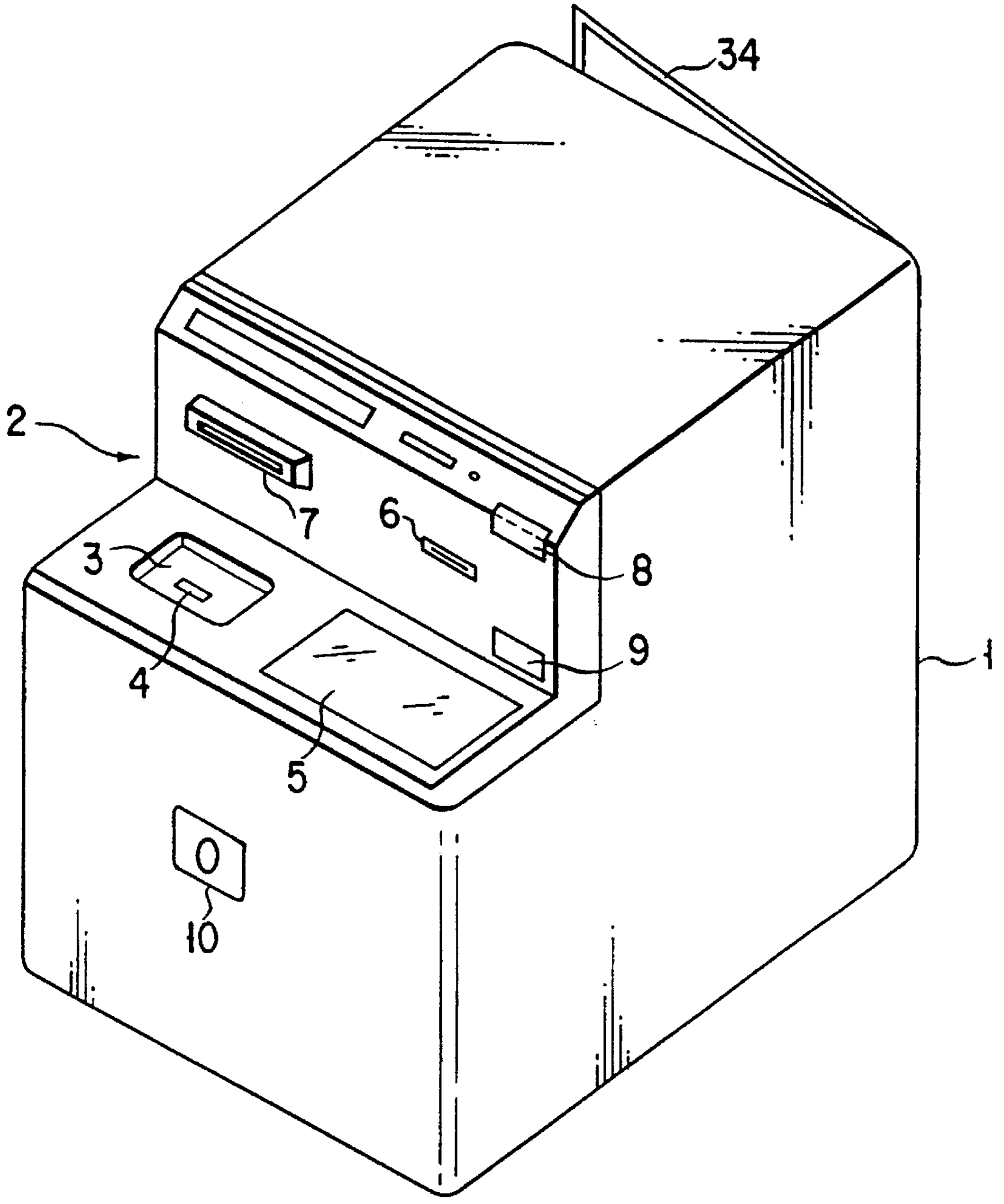
FIG. 1 is a perspective view showing the external appearance of an automatic transaction apparatus according to the present invention.

FIG. 1 shows the external appearance of an automatic transaction apparatus (e.g. automatic teller machine) according to the embodiment of the present invention. As is shown in FIG. 1, an L-shaped console unit 2 is provided on a front face of a frame 1. A horizontal face of the console unit 2 is provided with a banknote pocket 3 in which a number of banknotes and/or coins to be deposited, transferred, etc. can be inserted at a time and from which banknotes to be withdrawn and/or banknotes for change can be taken out by a customer. The banknote pocket 3 is provided with an automatic door 4. A rear face of the frame 1 is provided with a door 34 for permitting maintenance of the automatic transaction apparatus.

The horizontal face of the console unit 2 is provided with a color CRT display 5 including a touch sensor. The CRT display 5 displays, on CRT screen, operation procedures and other guidance information by means of illustrations, characters and/or messages. In addition, the CRT display 5 displays information relating to passwords, amounts and/or account numbers, and agreement, confirmation, or cancellation of transactions. The touch sensor (not shown) senses depression of associated display areas and delivers corresponding signals to a main control unit 11 (described later). The CRT display 5 can be activated by so-call key operations. For example, the CRT display 5 displays a message "input the password" and numeral keys for inputting the password. The display image is changed in accordance with mechanical operations and operation steps.

Moreover, the vertical face of the console unit 2 is provided with a card inlet 6 for insertion of a magnetic card (or a transaction medium) on which account data is recorded, a bankbook inlet 7 for insertion of a magnetic bankbook on which account data is recorded, a coin slot 8 from which coils are inserted, and a change coil port 9 from which change coins are received. A lower part of the front face of the frame 1 is provided with a customer sensor 10 for sensing the presence of a customer in front of the console unit 2. For example, an infrared sensor or an ultrasonic sensor is used as the customer sensor 10.

Figure 2:
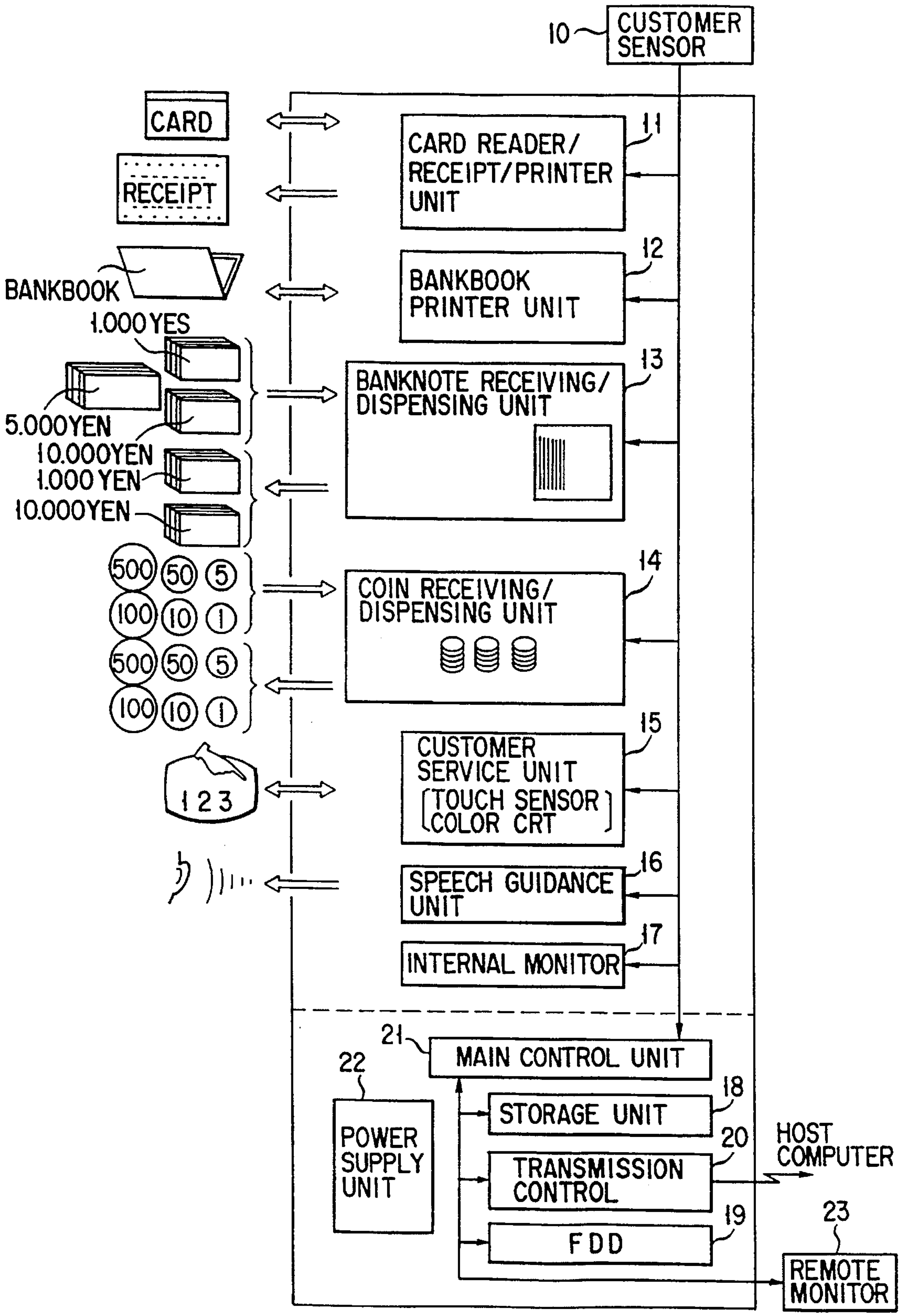
FIG. 2 is a block diagram showing schematically a control system of the automatic transaction apparatus shown in FIG. 1.

FIG. 2 is a block diagram showing schematically the structure of the automatic transaction apparatus having a banknote receiving/dispensing unit according to the present invention. A card reader/receipt printer unit 11 receives a magnetic card inserted from the card inlet 6 and reads account information such as account number data from magnetic stripes on the magnetic card. It issues a receipt on which the content of transaction is printed and discharges the receipt. A bankbook printer unit 12 receives a bankbook inserted from the bankbook inlet 7 and writes and reads data on magnetic stripes of the bankbook and also it prints the content of transaction on the bankbook. A banknote receiving/dispensing unit 13 receives banknotes inserted in the bankbook pocket 3 and also takes out a designated amount of banknotes from cash cassettes and dispenses the banknotes through the banknote pocket 3. A coin receiving/dispensing unit 14 receives coins inserted in the coin slot and dispensing a designated amount of coins through the change coin port 9.

Furthermore, the automatic transaction apparatus comprises a customer service unit 15 constituted by the CRT display 5; a speech guidance unit 16 for providing guidance to the customer by speeches generated from a loudspeaker; an internal monitor 17 for a bank clerk; a storage unit 18 for storing various data; a floppy disk drive (FDD) 19; a transmission control unit 20; a main control unit 21 for controlling these elements; and a power supply unit 22. The FDD 19 stores information of financial facilities (e.g. bank name, branch name) in the order of Japanese kana syllabary or in the alphabetical order, which information is necessary for transactions of transfer of money. The transmission control unit 20 controls data transfer with a host computer (central facilities) (not shown). The main control unit 21 is connected to an external remote monitor 23. The remote monitor 23 tells the bank clerk of deficiency of banknotes or coins when it occurs. The main control unit 21 is also connected to the customer sensor 10.

Figure 3:
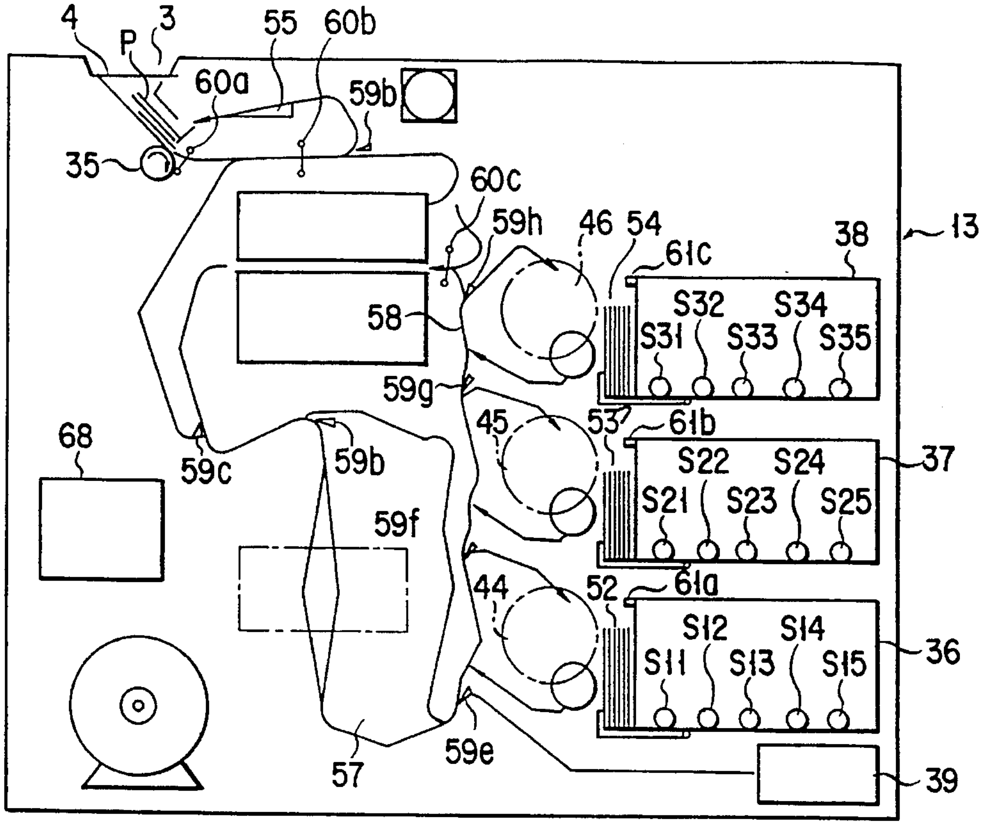
FIG. 3 is a cross-sectional side view showing schematically the internal structure of a banknote receiving/dispensing unit.

FIG. 3 shows the structure of the banknote receiving/dispensing unit 13. A banknote take-in/discharge device 35 is provided on the front-side region (the left-hand region in FIG. 3) in the unit 13 in the vicinity of the banknote pocket 3. First, second and third cash cassettes 36, 37 and 38, arranged from the bottom side in this order, are provided on the rear-side region (the right-hand region in FIG. 3) in the unit 13. The first and second cash cassettes 36 and 37 store 10,000-yen notes, and the third cash cassette 38 stores 1,000-yen notes. A rejected-note box 39 for storing banknotes rejected at the time of dispensation is provided below the first cash cassette 36. Attachment/detachment sensors 61*a* to 61*c* for sensing the attached/detached states of the cash cassettes 36, 37 and 38 are provided at distal end portions of the cash cassettes 36, 37 and 38. A mechanism for attaching/detaching the cash cassettes will be described later.

Temporary stackers 52, 53 and 54 and first, second and third stacking/taking-out devices 44, 45 and 46 are disposed in a substantially right-hand region of a central part of the unit 13 in the back-and-forth direction (i.e. right-and-left direction in FIG. 3) so as to face the first, second and third cash cassettes 36, 37 and 38. As the number of banknotes stored in each of the cash cassettes 36, 37 and 38 decreases, the banknotes are pushed forward and taken out by the stacking/taking-out devices 44, 45 and 46. A banknote separating mechanism (not shown) is provided between the first, second and third cash cassettes 36, 37 and 38 and the temporary stackers 52, 53 and 54 in order to distinguish the present transaction from the previous transaction.

In a substantially left-hand region of the central part of the unit 13 in the back-and-forth direction, there is provided a checking unit 56 for checking the genuineness, the kind, the presence of an obverse/reverse-side defect, and/or skew of banknotes P. A reversing unit 57 is provided below the checking unit 56, and a temporary stacking unit 55 is provided above the checking unit 56. At the time of dispensing banknotes, proper banknotes P are temporarily stacked in the temporary stacking unit 55. On the other hand, at the time of receiving banknotes, improper banknotes P with conspicuous skew are temporarily stacked in the temporary stacking unit 55.

A banknote transfer path 58 is formed in the unit 13. Sorting gates 59*b*, 59*c*, . . . , driven by rotary solenoids (not shown), are provided at branching points of the transfer path 58. The banknotes P are transferred to the respective sections along the transfer path 58. Banknote passage sensors 60*a*, 60*b*, . . . , are provided at predetermined points along the banknote transfer path 58. Each of the banknote passage sensors 60*a*, 60*b*, . . . is a well-known optical sensor comprising, for example, a light emission element and a light reception element.

Remaining-banknote sensors S11–S15, S21–S25 and S31–S35 for sensing the amount of remaining banknotes are provided within the cash cassettes 36, 37 and 38. By these sensors, the amount of remaining banknotes is sensed in five steps. Each of the remaining-banknote sensors S11–S15, S21–S25 and S31–S35 is a well-known optical sensor comprising, for example, a light emission element and a light reception element. In the cash cassettes 36, 37 and 38, the remaining-banknote sensors S11, S21 and S31 serve also as banknote end sensors for sensing the state in which the amount of remaining banknotes has decreased to a predetermined value.

A cash receiving/dispensing unit controller 68 for controlling the unit 13 under the control of the main control unit 21 is provided on the front region (left-hand region in FIG. 3) within the unit 13. Upon instructions from the main control unit 21, the cash receiving/dispensing unit controller 68 enables banknotes P of a designated amount to be taken out of the cash cassettes 36, 37 and 38 and brought to the banknote pocket 3, and tells the result of processing to the main control unit 21. In addition, upon instructions from the main control unit 21, the cash receiving/dispensing unit controller 68 enables the banknotes P inserted in the banknote pocket 3 to be taken in and also enables the checking unit 56 to determine the kind, obverse/reverse, etc. of the banknotes P, classify only proper banknotes P in the temporary stackers 52, 53 and 54, return improper banknotes P in the temporary stacking unit 55, recognize the check result, and report the result of processing to the main control unit 21.

The cash receiving/dispensing unit controller 68 monitors the banknote receiving/dispensing unit 13 at all times, determines the amounts of remaining banknotes P in the cash cassettes 36, 37 and 38 sensed by the remaining-banknote sensors S11–S15, S21–S25 and S31–S35 and abnormality of the structural units on the basis of outputs from the banknote passage sensors 60*a*, 60*b*, . . . , and tells the result of determination to the main control unit 21.

Figure 4:
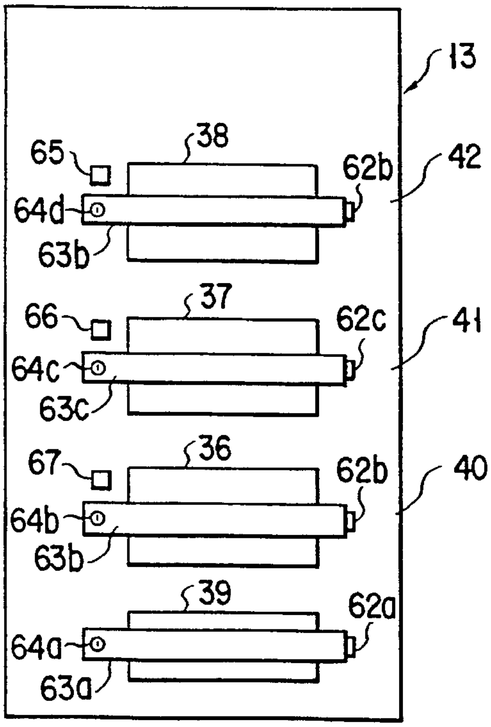
FIG. 4 shows schematically an attaching/detaching mechanism for cash cassettes of the receiving/dispensing unit according to the present invention.

With reference to FIG. 4, a description will now be given of an attaching/detaching mechanism for the cash cassettes 36, 37 and 38 and rejected-note box 39 in the banknote receiving/dispensing unit 13 according to the present invention. The rear side of the banknote receiving/dispensing unit 13, as shown in FIG. 4, is made accessible by opening the door 34 provided on the rear face of the frame 1. The cash cassettes 36, 37 and 38 and rejected-note box 39 are attachable/detachable from the rear side of the cash receiving/dispensing unit 13 and are protected by cassette protect doors 63*a* to 63*d* attached to the unit 13 via hinges 62*a* to 62*d*. The cassette protect doors 63*a* to 63*d* are fixed to the unit 13 by means of protect door locks 64*a* to 64*d*. The cash cassettes 36, 37 and 38 and rejected-note box 39 cannot easily be detached without keys.

Figure 5:
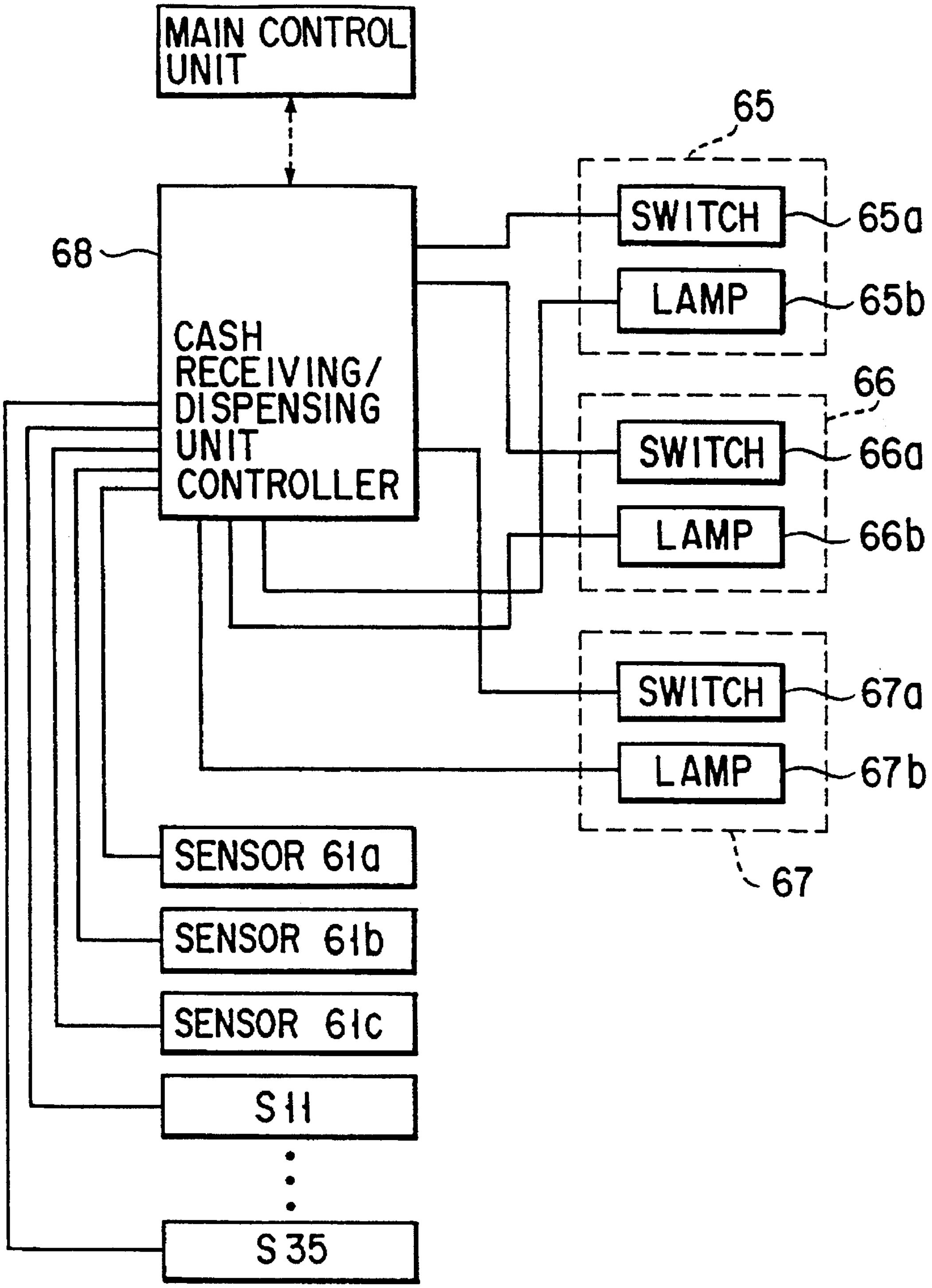
FIG. 5 shows push-bottom switches and sensors connected to the receiving/dispensing unit controller.

The cash cassette 36, protect door 63*b*, etc. are contained in a banknote storage unit 40. The cash cassette 37, protect door 63*c*, etc. are contained in a banknote storage unit 41, and the cash cassette 38, protect door 63*d*, etc. are contained in a banknote storage unit 42. Red-light push-button switches 65, 66 and 67 including lamps in push buttons are provided near banknote storage units 40, 41 and 42. As is shown in FIG. 5, each of the push-button switches 65 to 67 comprises a lamp (65*b*, 66*b*, 66*b*) and a switch (65*a*, 66*a*, 67*a*) as one body and is connected to the cash receiving/dispensing unit controller 68. When the push-button switch (65, 66 and 67) is depressed, the depression of the push-button switch is told to the main control unit 21 via the cash receiving/dispensing unit controller 68. In addition, the lamp in the push button is turned on, turned off, or flickered at a chosen cycle by the cash receiving/dispensing unit controller 68 under the control of the main control unit 21. The cash receiving/dispensing unit controller 68 is connected to the sensors 61*a*, 61*b* and 61*c* and sensors S11 to S35. The attachment/detachment state of each cassette and the amount of remaining banknotes in each cassette are told to the main control unit 21 via the cash receiving/dispensing unit controller 68.

The operation of the apparatus having the above structure will now be described. In response to the customer's transaction operations, the main control unit 21, where necessary, enables the cash cassette 36 of the first 10,000-yen note storage unit 40 or the cash cassette 37 of the second 10,000-yen note storage unit 41 to discharge 10,000-yen notes and the cash cassette 38 of the 1,000-yen note storage unit 42 to discharge 1,000-yen notes. It also controls the lamps in the push buttons.

The main control unit 21 determines the cash cassette to be used in the transaction, on the basis of the following conditions: the attached/detached state each of the cash cassettes 36, 37 and 38, the amount of remaining banknotes in each of the cash cassettes 36, 37 and 38, the presence/absence of abnormality of each of the cash cassettes 36, 37 and 38, the prestored data on the priority of use of the cassettes, etc. Specifically, the main control unit 21 stores the data on the state in which the non-used cash cassette 36, 37 or 38 is "separated (detachable)" from the banknote transaction control operation. At the time of carrying out cash dispensing/receiving operations, the main control unit 21 controls the cash receiving/dispensing unit controller 68 so that the separated cash cassettes 36, 37 and 38 will not be used. Even if the "separated" cash cassette is detached, the detachment is not determined to be an error.

However, if the cash cassette is detached, the items or contents of transactions handled by the present apparatus may be limited. For example, if the cash cassette 38 is detached from the 1,000-yen note storage unit 42 by a bank clerk, only 10,000-yen notes can be dispensed and transactions which may necessitate payment of change are prohibited. If the cash cassettes 36, 37 and 38 in all the banknote storage units 40, 41 and 42 are detached, all transaction items necessitating dispensation/reception of banknotes P are prohibited.

Accordingly, if the cash cassette is detached by the bank clerk after the customer selected the transaction item and began the transaction and before the transaction is completed, the customer may inconveniently be prevented from carrying out the selected transaction.

Furthermore, if the cash cassette (36, 37, 38) is detached while the banknotes P are being taken out from this cassette under the control of the main control unit 21, the cash receiving/dispensing unit controller 68 detects abnormality and informs the abnormality to the main control unit 21. Consequently, the transaction is suspended and the customer is inconveniently prevented from carrying out the transaction.

In order to prevent the bank clerk from erroneously detaching the cash cassette 36, 37 or 38, the main control unit 21 indicates the states of the cash cassettes 36, 37 and 38 by means of the lamps of the push button switches 65 to 67, as shown in FIG. 6. When the cash cassette being separated detachable, the associated lamp is turned off. When the cash cassette is in operation, the lamp is turned on. When the cash cassette is ready, the lamp is flickered at cycle of one second. When a request for separation is being accepted, the lamp is flickered at cycle of 0.5 second. When the cash cassette is being detached, the banknotes are not taken out from the cassette even if the customer's cash dispensing/receiving transaction is executed.

For example, when banknotes of the same kind (10,000 yen) are stored in the cash cassettes 36 and 37 and banknotes of another kind (1,000 yen) are stored in the cash cassette 38, it may be decided that the cash cassette 36 is preferentially used for receiving/dispensing 10,000-yen notes. Thereby, the cash cassette 37 can be separated and the lamp of the push-button switch 66 is turned off.

If any one of the cash cassettes 36, 37 and 38 is empty since all stored banknotes therein have been discharged, that cash cassette is not used and therefore it is automatically separated. Accordingly, the lamp of the associated push-button switch is turned off. Moreover, if the separation of the cash cassette has been requested or designated by the operation of the push-button switch by the bank clerk, the associated lamp of the push-button switch is turned off after the transaction.

Thus, since the lamp is turned off under the control of the CPU 21, the cash cassettes 36, 37 and 38 that are detachable can be recognized and the bank clerk can remove the appropriate cash cassette, the lamp associated with which is turned off.

Inversely, if the cash cassette being operated to dispense banknotes in the cash dispensing process was detached, the transaction would be suspended. In order to indicate that the cash cassette is in operation, the lamp of the associated push-button switch, 65 to 67, is turned on.

When the customer is in front of the apparatus or when the cash dispensing operation is to be carried out, the lamp of the push-button switch of the associated cash cassette is flickered at a cycle of one second in order to indicate that the associated cash cassette is ready. For example, in the case where the banknotes of one kind (10,000-yen notes) are stored in the cash cassettes 36 and 37, the banknotes of another kind (1,000-yen notes) are stored in the cash cassette 38 and the cash cassette 36 is preferentially used for 10,000-yen notes, as mentioned above, 10,000-yen notes are taken out from the cash cassette 36 where necessary. Thus, if the customer is in front of the apparatus, the cash cassette 36 must be prevented from being detached during the transaction. To achieve this, the lamp associated with the cash cassette 36 is flickered at a cycle of one second.

The cash cassette in the above-mentioned ready state or in operation cannot be detached. However, the separation of the cash cassette can be designated by the associated push-button switch. In this case, the cash cassette cannot be separated immediately, but it can be separated after completion of the transaction selected and initiated by the customer. Thus, when the separation of the cash cassette in the ready state or in operation has been requested by the associated push-button switch, the lamp of the push-button switch is flickered at a cycle of 0.5 second to indicate that the request for separation has been accepted. However, if the customer is not present in front of the apparatus and the transaction is not initiated while the cash cassette is in the ready state, no problem will occur if the cash cassette is separated upon request. Thus, the cash cassette is immediately separated and the lamp flickering at a cycle of one second is turned on.

The state of each of the cash cassettes 36, 37 and 38 is stored in the storage unit 18 in a table format as shown in FIG. 7. Specifically, the storage unit 18 stores the following data in association with the cash cassettes 36, 37 and 38: data on the kinds and numbers of stored banknotes; cassette separation state information representing states in which the cash cassette is operating, in the ready state, being separated, or a request for separation is being accepted; and end flags indicating whether or not the cash cassette is in the banknote end state.

When the transaction is initiated, the main control unit 21 refers to the cash cassette state information stored in the storage unit 18, thereby issuing instructions to take out banknotes from the cash cassette in the ready state. Accordingly, if the cash cassette 38 is in the "separated" state, 1,000-yen notes cannot be dispensed and only 10,000-yen notes can be dispensed.

When the banknote end (indicating the decrease in amount of banknotes at a predetermined level) is sensed by the banknote end sensor (S11, S21, S31), the main control unit 21 writes "1" in the associated end flag of the cash cassette state information and sets the associated cash cassette in the "separated" state. Furthermore, on the basis of the bank clerk's operation of the push-button switches 65 to 67, the main control unit 21 rewrites the "separated" state information of the cash cassette state information.

Figure 8:
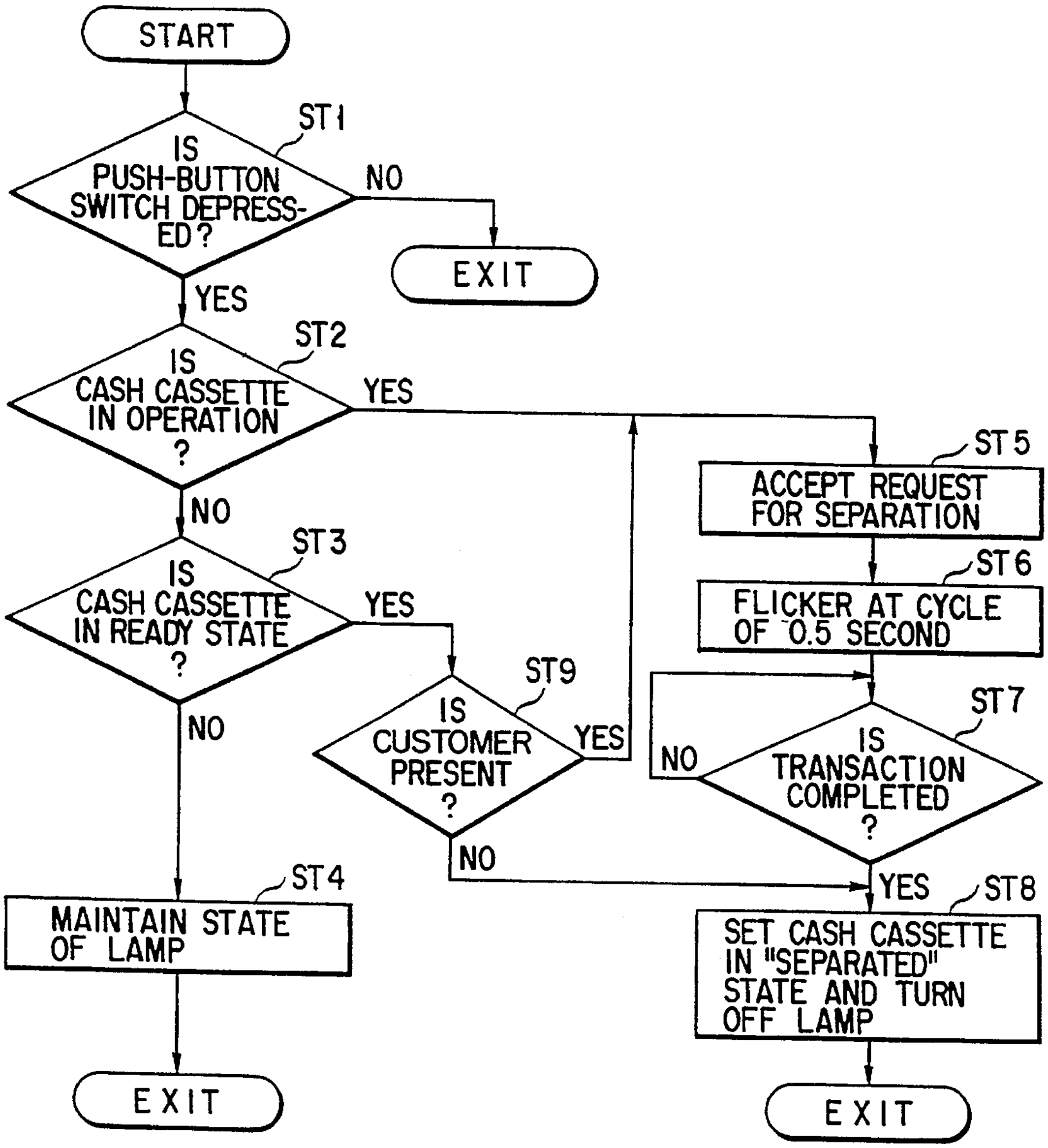
FIG. 8 is a flow chart for explaining the control of lamps by push buttons.
Figure 9:
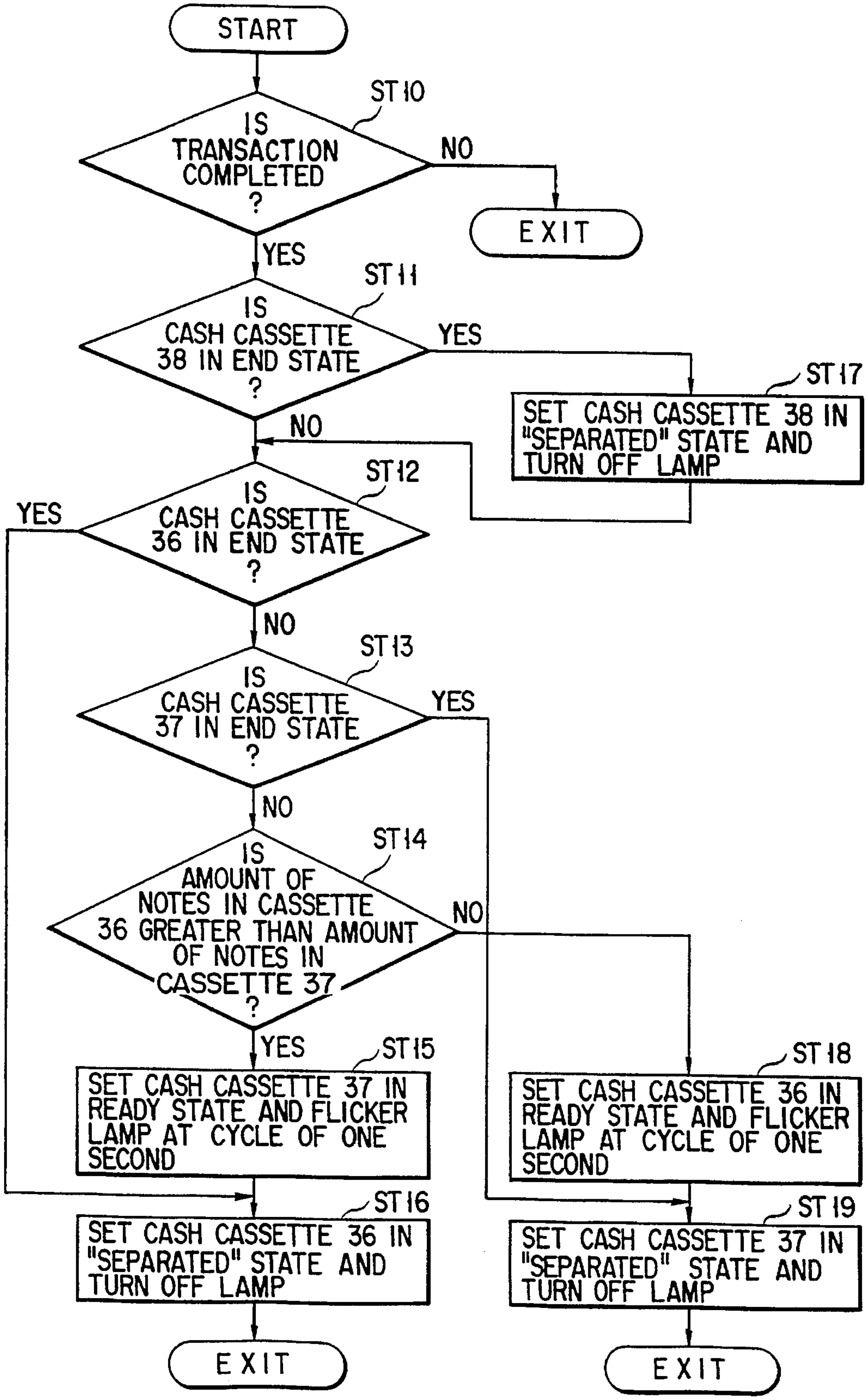
FIG. 9 is a flow chart for explaining the control for determining which one of the cash cassettes storing the same kind of banknotes should be used preferentially.
Figure 10:
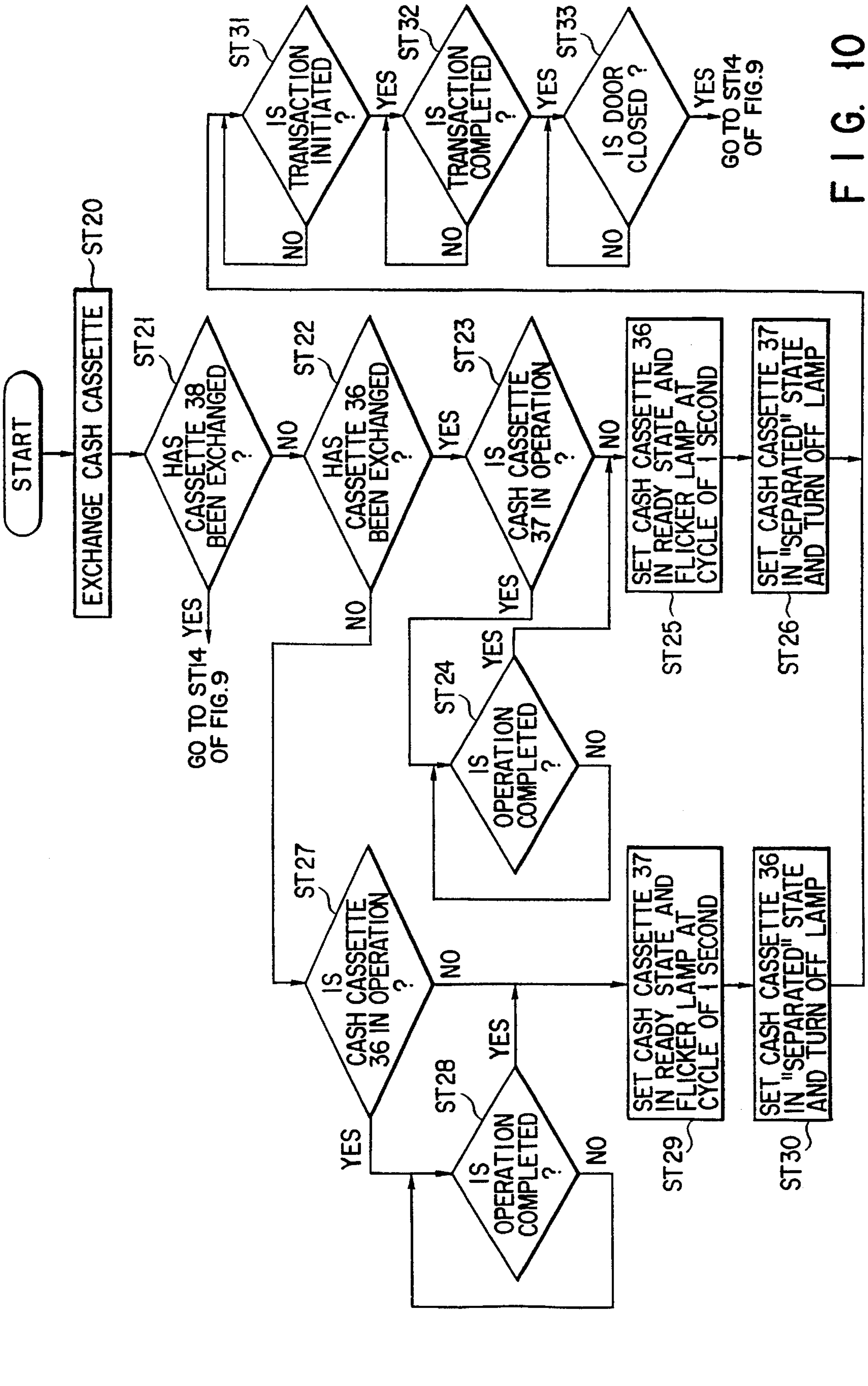
FIG. 10 is a flow chart for explaining the operation in the case where the cash cassette has been exchanged.

The operation of the automatic transaction apparatus according to the present invention will now be described with reference to flow charts of FIGS. 8 to 10. At first, the control of the lamps of the push-button switches 65 to 67 will be described with reference to the flow chart of FIG. 8. It is monitored whether any of the push-button switches 65 to 67 has been depressed (step ST1). If any one of the push-button switches 65 to 67 has been depressed (YES in ST1), it is confirmed whether the associated cash cassette is in operation (step ST2). If the associated cash cassette is not in operation (NO in ST2), it is then confirmed whether the cash cassette is in the ready state (step ST3). If the cash cassette is neither in operation nor in the ready state, the cash cassette is being "separated" or the request for separation is being accepted. Thus, the state of the lamp of the push-button switch is maintained and is not changed (step ST4).

If it is determined in step ST2 that the designated cash cassette is in operation (YES in ST2), the request for "separation" is accepted (step ST5) and the lamp of the associated push-button switch is flickered at a cycle of 0.5 second (step ST6). When the current transaction is completed (step ST7), the lamp flickering at the cycle of 0.5 second is turned off to indicate the state in which the cash cassette can be detached, thereby setting the cash cassette in the "separated" state (step ST8). This setting of the state is effected by changing the associated item of the "separated state" in FIG. 6.

If it is confirmed in step ST3 that the designated cash cassette is in the ready state (YES in ST3), it is confirmed whether the customer is in front of the apparatus (step ST9). This confirmation is effected by the customer sensor 10 provided on the front face of the frame 1, the insertion of the customer's card into the card inlet 6, or the touch sensor of the CRT display 5. If the customer is not present in front of the apparatus, no problem will occur even if the cash cassette is "separated." Thus, the cash cassette is "separated" in response to the request for "separation" and the lamp is turned off (step ST8). If the customer is present, the control routine goes to step ST5.

According to the present invention, the states of the cash cassettes (e.g. "ready", "operating", "separated") can be recognized instantaneously by the lamps of the light-emission type push-button switches. Even when the present apparatus is performing the transaction processing, the cash cassette, the associated lamp of which is turned off, can be attached/detached for replenishing/recovering banknotes.

As in steps ST2 and ST5 to ST8, even when the transaction apparatus is carrying out the transaction processing, the cash cassette in the ready state or in operation can be separated by depressing the associated push-button switch.

When a plurality of cash cassettes storing the same kind of banknotes, such as cash cassettes 36 and 37, are mounted, the banknotes can be replenished or recovered by detaching the cash cassettes without suspending the operation of the apparatus or limiting the kinds of transaction items.

When the customer is present in front of the apparatus or the transaction is being performed, the lamp of the push-button switch associated with the cash cassette, from which banknotes are to be preferentially taken out, is flickered at a cycle of one second. Thereby, the cash cassette, from which banknotes may be taken out, is easily recognized, and erroneous detachment of the cash cassette can be prevented.

If the associated push-button switch is depressed by the bank clerk while the cash cassette is being operated to request the separation or exchange of the cash cassette, the lamp of the depressed push-button switch is flickered at a cycle of, e.g. 0.5 second, as in step ST6, which cycle is different from that for the ready state. Thereby, the reception of the request for separation is easily recognized.

A process of determining which one of cash cassettes 36 and 37 storing 10,000-yen banknotes should be preferentially used will now be described with reference to a flow chart of FIG. 9.

If the end of the customer's transaction is determined in step ST10, the end flag of the cash cassette state information stored in the storage unit 18 is referred to and it is determined whether or not the cash cassette 38 is in the banknote end state (step ST11). If the cash cassette 38 is in the banknote end state, the cash cassette 38 is separated, the separation state information of the cash cassette state information stored in the memory unit 18 is set to "separated", and the lamp of the push-button switch 65 associated with the cash cassette 38 is turned off (step ST17). Then the control routine goes to step ST12. In this case, the end state of the cash cassette 30 is told to the remote monitor 23 and the bank clerk is informed that there is no banknote in the cash cassette 30.

If the cash cassette 38 is not in the banknote end state (NO in ST11), the control routine goes to step ST12. In step ST12, the end flag of the cash cassette state information stored in the storage unit 18 is referred to and it is determined whether or not the cash cassette 36 is in the banknote end state. If the cash cassette 36 is not in the banknote end state, it is similarly determined whether or not the cash cassette 37 is in the banknote end state (step ST13).

If neither the cash cassette 36 nor cash cassette 37 is in the banknote end state, the amount of banknotes stored in the cash cassette 36 is compared with the amount of banknotes stored in the cash cassette 37 (step ST14). The comparison is performed by reference to the sensed results of the remaining-banknote sensors S11 to S15 and S21 to S25.

If it is determined that the amount of banknotes stored in the cash cassette 36 is greater than the amount of banknotes stored in the cash cassette 37 (YES in ST14), the cash cassette 37 storing less banknotes is set in the "ready" state, the state information of the case cassette 37 stored in the storage unit 18 is in the "ready" state, and the lamp of the push-button switch 66 associated with the cash cassette 37 is flickered at a cycle of one second (step ST15).

Thereafter, the cash cassette 36 storing more banknotes is separated, the state information of the cash cassette 36 stored in the storage unit 18 is set to "separated", and the lamp of the push-button switch 67 associated with the cash cassette 36 is turned off (step ST16).

If it is determined in step ST14 that the amount of banknotes stored in the cash cassette 37 is greater than the amount of banknotes stored in the cash cassette 36, the cash cassette 36 storing less banknotes is set in the "ready" state, the state information of the case cassette 36 stored in the storage unit 18 is in the "ready" state, and the lamp of the push-button switch 67 associated with the cash cassette 36 is flickered at a cycle of one second (step ST18).

Thereafter, the cash cassette 37 is separated, the state information of the cash cassette 37 stored in the storage unit 18 is set to "separated", and the lamp of the push-button switch 66 associated with the cash cassette 37 is turned off (step ST19).

If the cash cassette 36 is in the banknote end state (YES in step ST12), the control routine goes to step ST16 and operations similar to those described above are executed. If the cash cassette 37 is in the banknote end state (YES in step ST3), the control routine goes to step ST19 and operations similar to those described above are executed. In either case, the banknote end state is told to the remote monitor and the bank clerk is informed of deficiency of banknotes.

According to the present invention, the cash cassette 37 storing less banknotes is used preferentially. It is thus possible to avoid a situation from arising wherein the cash cassettes 36 and 37 enter the banknote end state at substantially the same time, and therefore the operation efficiency of the automatic transaction apparatus can be enhanced remarkably.

In steps ST16, ST17 and ST19, the lamp of the push-button switch associated with the cash cassette in the banknote end state is turned off. It is possible, therefore, to identify the cash cassette requiring replenishment of banknotes.

The operation in the case where the cash cassette has been exchanged will now be described with reference to a flow chart of FIG. 10. The bank clerk opens the rear door 34 of the frame 1 to access to the rear part of the cash receiving/dispensing unit 13, as shown in FIG. 4.

The bank clerk confirms the states of the cash cassettes by viewing the lamps of the push-button switches 65 to 67, and detaches the cash cassette in the "separated" state and attaches another cash cassette storing banknotes. In step ST20, the exchange of the cash cassette is recognized by the attachment/detachment sensors 61*a* to 61*c* provided at the end portions of the cash cassettes 36 to 38. The control unit 21 determines whether or not the cash cassette 38 has been exchanged (step ST21). If the cash cassette 38 has been exchanged, the control routine goes to step ST14 as shown in FIG. 9.

In step ST21, if the cash cassette 38 has not been exchanged, the control unit 21 determines whether or not the cash cassette 36 has been exchanged. If the cash cassette 36 has been exchanged (YES in ST22), it is determined whether or not the other cash cassette 37 storing the same kind of banknotes is in operation (step ST23). If the other cash cassette 37 is in operation (YES in ST23), the completion of the transaction operation is awaited (step ST24).

If the cash cassette 37 is not in operation (NO in ST23) or the transaction operation is completed (YES in ST24), the state information of the cash cassette 36 stored in the memory unit 18 is set in the ready state, and the lamp of the push-button switch 67 associated with the cash cassette 36 is flickered at a cycle of one second (step ST25).

In step ST26, the state information of the cash cassette 37 stored in the storage unit 18 is set to "separated" and the lamp of the push-button switch 66 associated with the cash cassette 37 is turned off.

If "NO" in step ST22, the CPU 21 determines that the cash cassette 37 has been exchanged and determines whether or not the other cash cassette 36 storing the same kind of banknotes is in operation (step ST27). If the cash cassette 36 is in operation, the completion of the transaction operation is awaited (step ST28).

If the cash cassette 36 is not in operation in step ST27 or the transaction operation is completed in step ST28, the state information of the cash cassette 37 stored in the storage unit 18 is set to "ready" and the lamp of the push-button switch 66 associated with the cash cassette 37 is flickered at a cycle of one second.

In step ST30, the state information of the cash cassette 36 stored in the storage unit 18 is set to "separated" and the lamp of the push-button switch 67 associated with the cash cassette 36 is turned off.

Subsequently, the next transaction is sensed (step ST31). After the transaction has been completed (step ST32), it is determined whether or not the rear door 34 of the apparatus is closed (step ST33). If the rear door 34 is closed, the control routine goes to step ST14 illustrated in FIG. 8. Thus, the cash cassette storing less banknotes is used preferentially.

In the case where one of the cash cassette 37 and 36 storing the same kinds of banknotes has been exchanged, the substituted cassette is preferentially used. In particular, if at least one transaction is carried out before the rear door is closed and a setting error of the cash cassette occurs, such an error can be immediately corrected since the bank clerk is still in rear of the apparatus.

If there are a plurality of cash cassettes storing the same kind of banknotes and one of the cash cassettes is exchanged, the substituted cash cassette is preferentially use until at least one transaction is completed and the rear door 34 is closed. By separating the non-exchanged cash cassette storing the same kind of banknotes from the control operation, the operation of the substituted cash cassette can be confirmed and the other cash cassette can be exchanged. Accordingly, the operation efficiency and operability can be further enhanced.

In the above embodiment, the control of the cash cassette separation, the control of the push-button switch and the control of the lamp are effected by the main control unit. However, these controls may be carried out by the cash receiving/dispensing unit controller and only the result of separation of the cassette from the control operation may be told to the main control unit.

In addition, in the above embodiment, the lamp of the light-emission type push-button switch is used as means for displaying the state of the cash cassette. However, the state of the cash cassette may be displayed by means of, for example, a liquid crystal display with use of characters and/or illustration for easier recognition.

Moreover, in the above embodiment, the invention is applied to the banknote receiving/dispensing unit containing the cash cassettes for storing banknotes. However, this invention is also applicable to a coin receiving/dispensing unit containing cash cassettes for storing coins.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An automatic transaction apparatus for performing a cash withdrawal transaction based on a customer's operation, said apparatus comprising:

a plurality of cash cassettes storing cash for dispensation, said cash cassettes being detachably attached to the automatic transaction apparatus;

dispensing means for dispensing cash stored in the cash cassettes for the withdrawal transaction;

determination means for determining an operation state of the dispensing means indicating which of the cash cassettes may be detached and which of the cash cassettes may not be detached, the cash cassettes being detachable when not being used for the withdrawal transaction, the cash cassettes not being detachable when being used for the withdrawal transaction, the operation state being determined on the basis of the operation state of the automatic transaction apparatus;

display means, provided in association of each of the cassettes, for indicating whether the associated cassette is in a detachable state when the associated cassette is not being used for the withdrawal transaction, the indication being made on the basis of the operating state determined by said determination means;

designation means for permitting designation of a cassette that is targeted for detachment from among the cash cassettes for which the display means do not indicate the detachable state;

sensing means for sensing that the cash cassettes for which the display means do not indicate the detachable state have become detachable, on the basis of the determination result of the determination means; and display changing means for changing the display means to indicate the detachable state for an associated cassette when the display means previously did not indicate that the associated cassette had the detachable state and when said sensing means has sensed that the associated cassette has become detachable.

2. The apparatus according to claim 1, further comprising:

a plurality of sensor means for sensing the state of each of the cassettes in which the amount of cash is below a predetermined value; and control means for controlling said display means to indicate a detachable state for one of the cash cassettes when said sensor means has sensed that the amount of cash in the cassette is below the predetermined value.

3. An automatic transaction apparatus for automatically performing a cash transaction, said apparatus comprising:

a plurality of cash storage means, detachably attached to said apparatus, for storing cash;

cash dispensing means for taking out cash from said cash storage means and dispensing the cash;

first display means for indicating that detachment of said cash storage means is allowable before the cash in the storage means is depleted;

second display means for indicating the state in which the cash storage means is operating, when the cash is being taken out of the cash storage means by the cash dispensing means; and third display means for displaying a ready state of the cash stòrage means from which cash is possibly taken out by the dispensing means in the cash transaction.

4. The apparatus according to claim 3, further comprising:

designation means for designating separation of the cash storage means from the cash transaction; and fourth display means for indicating that the cash storage means in operation has accepted a request for detachment, when the separation of the cash storage means in operation has been designated by said designation means.

5. The apparatus according to claim 3, further comprising:

designation means for designating separation of the cash storage means from the cash transaction; and fourth display means for indicating that the cash storage means in the ready state has accepted a request for detachment, when the separation of the cash storage means in the ready state has been designated by said designation means and the customer is present at a predetermined position near the apparatus.

6. The apparatus according to claim 3, further comprising:

designation means for designating separation of the cash storage means from the cash transaction;

fourth display means for indicating that the cash storage means in operation has accepted a request for detachment until the operation of the cash storage means is completed, when the separation of the cash storage means in operation has been designated by said designation means; and control means for controlling the cash storage means to be separated from the cash transaction when the operation of the cash storage means is completed, and controlling the first display means to indicate that the cash storage means has been separated 7. The apparatus according to claim 3, further comprising:

a plurality of sensor means for sensing the state of each of the cash storage means in which the amount of cash is below a predetermined value; and control means for controlling said first display means to indicate that detachment of said cash storage means is allowable, when said sensor means has sensed that the amount of cash in the cash storage means is below the predetermined value.

8. An automatic transaction apparatus for automatically performing a cash transaction, said apparatus comprising:

a plurality of detachable cash storage means for storing cash, at least two of the cash storage means storing the same kind of currency;

first removing means for removing cash from a first of said at least two cash storage means storing the same kind of currency, the first of said at least two cash storage means containing less cash and being determined on the basis of the sensed results of said remaining-cash sensing means; and display means for indicating that detachment of a second of said at least two cash storage means storing the same kind of currency is allowable before depletion of cash from within the cash storage means, the second of said at least two storage means containing more cash and being determined on the basis of the sensed results of said remaining-cash sensing means.

9. The apparatus according to claim 8, further comprising second removing means for preferentially removing cash from a substituted cash cassette when one of said at least two of the cash storage means storing the same kind of currency has been exchanged for the substituted cash cassette.

10. The apparatus according to claim 9, further comprising:

third removing means for preferentially removing cash from a non-exchanged cash cassette until, at least, said transaction is completed when one of said at least two of the cash storage means storing the same kind of currency has been exchanged during a transaction; and means for controlling said substituted cash storage means to be separated from a transaction control operation after said transaction, and controlling said display means to indicate that said cash storage means has been separated.

11. The apparatus according to claim 9, further comprising:

a maintenance door for use in exchanging said cash storage means; and third removing means for preferentially removing cash from a substituted cash cassette until, at least, said door is closed when one of said at least two of the cash storage means storing the same kind of currency has been exchanged.

12. The apparatus according to claim 8, further comprising second removing means for preferentially removing cash from a non-exchanged cash cassette, until, at least, said transaction is completed when one of said at least two of the cash storage means storing the same kind of currency has been exchanged during a transaction.

13. An automatic transaction apparatus for performing a cash withdrawal transaction based on a customer's operation, said apparatus comprising:

a plurality of cash cassettes storing cash for dispensation, said cash cassettes being detachably attached to the automatic transaction apparatus;

dispensing means for dispensing cash stored in the cash cassettes for the withdrawal transaction;

determination means for determining an operation state of the dispensing means indicating which of the cash cassettes may be detached and which of the cash cassettes may not be detached, the cash cassettes being detachable when not being used for the withdrawal transaction, the cash cassettes not being detachable when being used for the withdrawal transaction, the operation state being determined on the basis of the operation state of the automatic transaction apparatus; and display means, provided in association of each of the cassettes, for indicating whether the associated cassette is in a detachable state when the associated cassette is not being used for the withdrawal transaction, the indication being made on the basis of the operating state determined by said determination means.

* * * * *